March 3, 1970      E. T. LONG      3,498,742
GAS STERILIZATION APPARATUS
Filed May 16, 1967      3 Sheets-Sheet 1
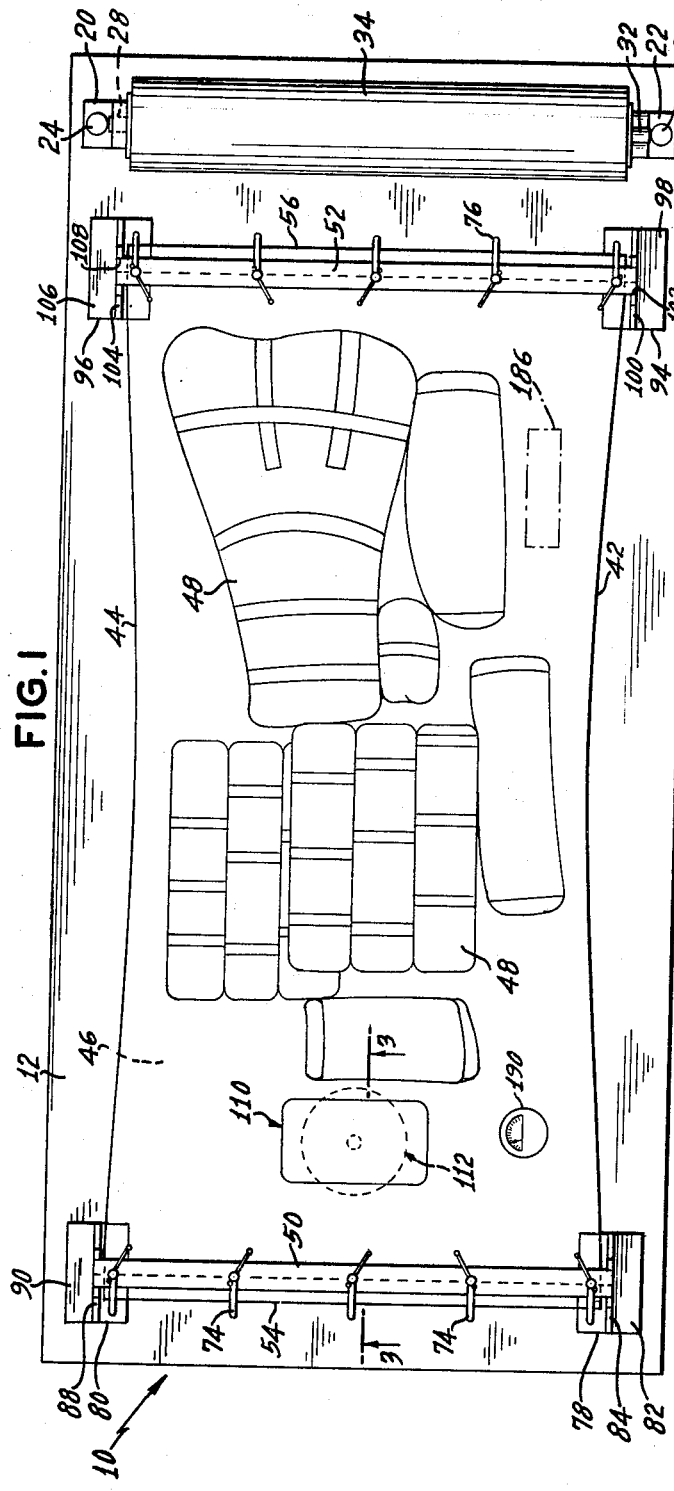
INVENTOR.
Edwin T. Long
BY
George H. Baldwin
ATTORNEY March 3, 1970 E. T. LONG 3,498,742
GAS STERILIZATION APPARATUS
Filed May 16, 1967 3 Sheets-Sheet 2
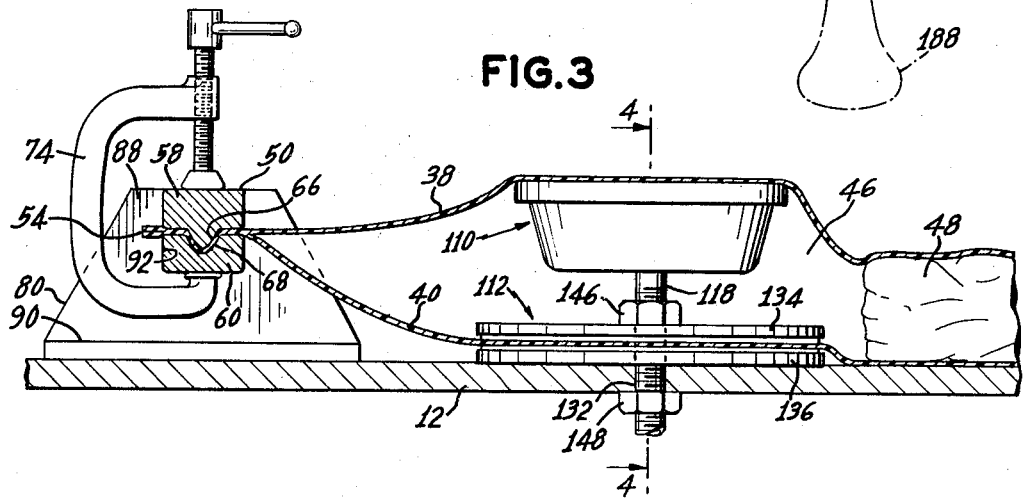
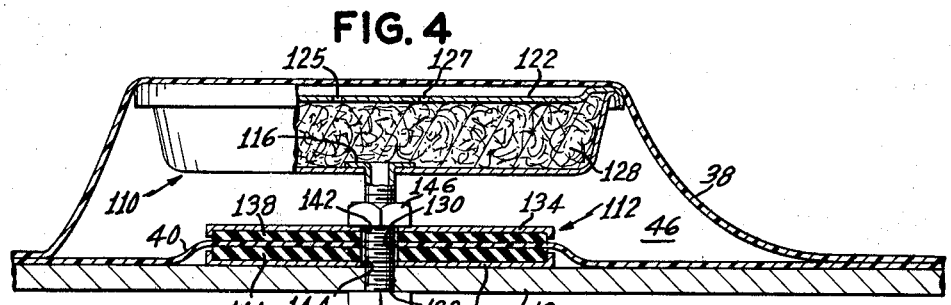
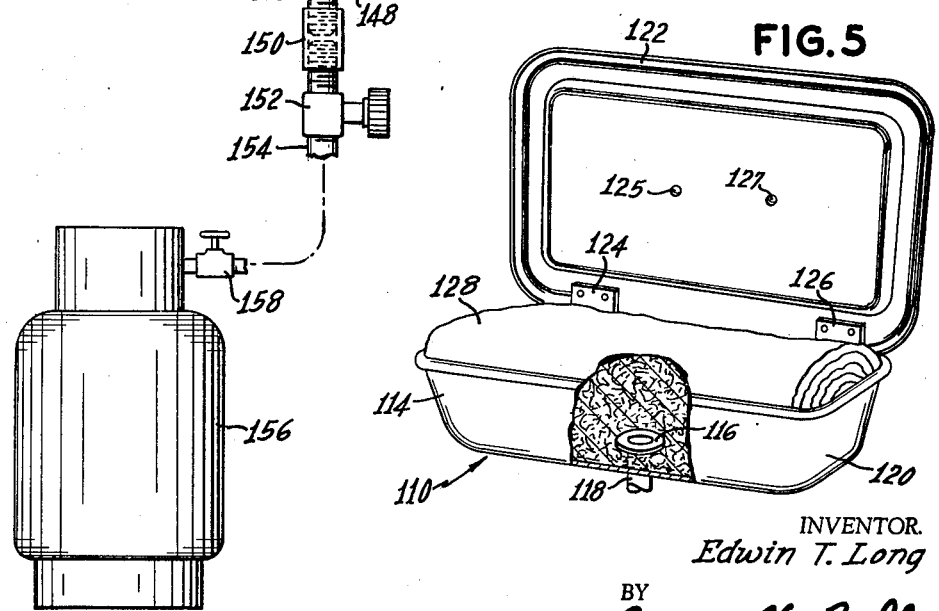
INVENTOR.
Edwin T. Long
BY
George H. Baldwin
ATTORNEY March 3, 1970  E. T. LONG  3,498,742
GAS STERILIZATION APPARATUS
Filed May 16, 1967  3 Sheets-Sheet 3
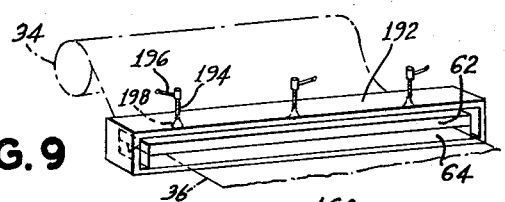
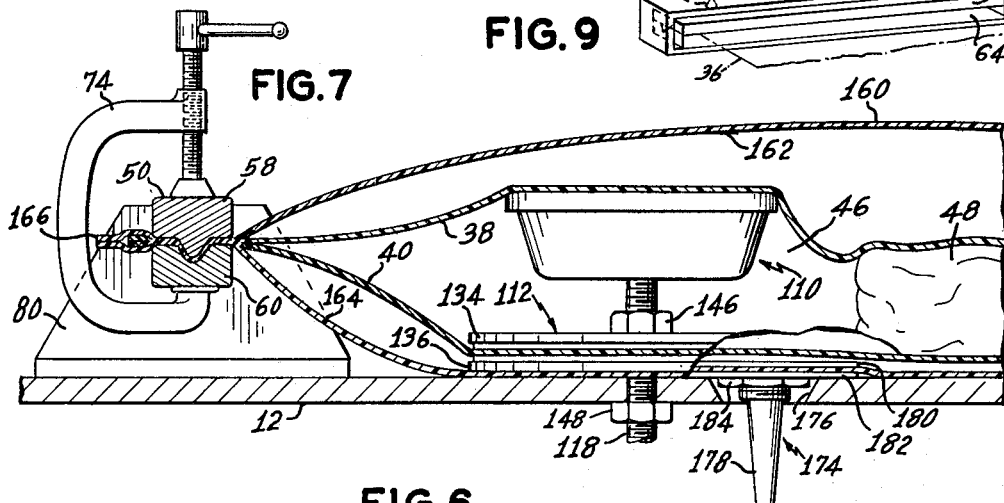
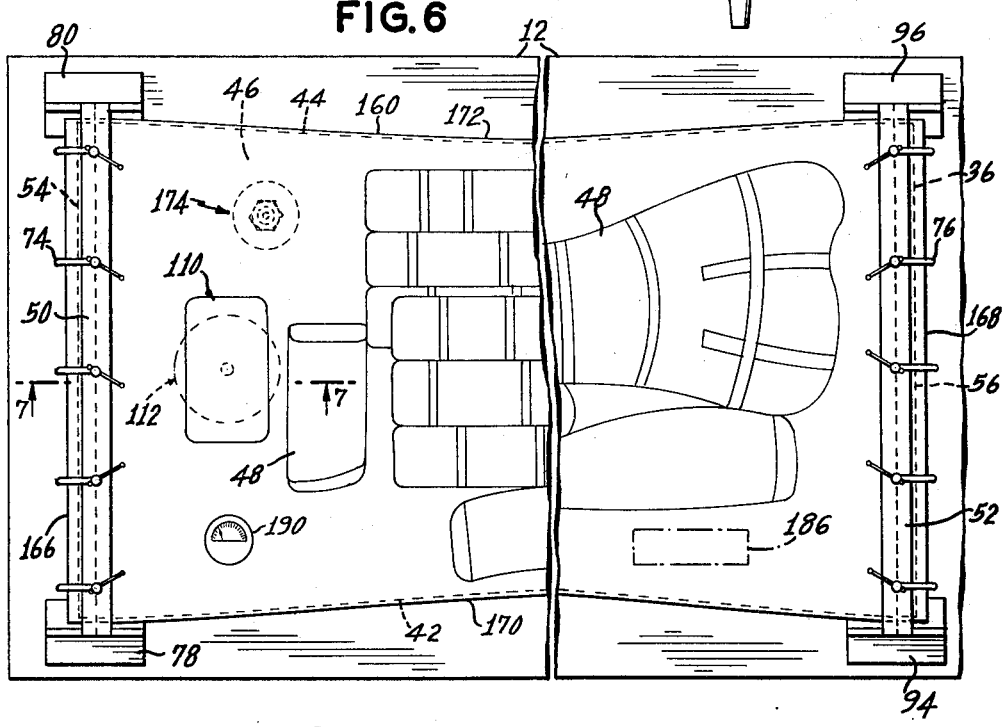
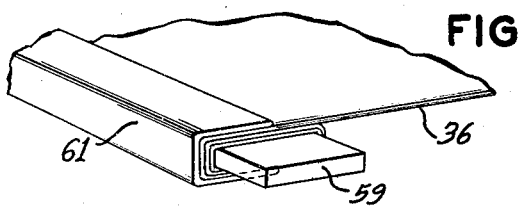
INVENTOR.
Edwin T. Long
BY
George H. Baldwin
ATTORNEY

United States Patent Office 3,498,742
Patented Mar. 3, 1970

3,498,742
GAS STERILIZATION APPARATUS
Edwin T. Long, % Watson Clinic, Lakeland, Fla.
Filed May 16, 1967, Ser. No. 638,847
Int. Cl. A61l *3/00, 5/00, 7/00*
U.S. Cl. 21—91     16 Claims

ABSTRACT OF THE DISCLOSURE

An improved portable apparatus for use in a sterilization process which can be carried out at room or ambient temperatures and at or near atmospheric pressures, and which employs an ethylene oxide gas mixture as the sterilant. The apparatus including a completely flexible, collapsible, foldable, transparent, and easily replaceable sterilization chamber which is impervious to an ethylene oxide sterilizing gas mixture. The sterilization chamber comprises a sleeve, having sealable open ends, which is formed from a low porosity, high density plastic film obtainable from a copolymer of vinylidene chloride and vinylchloride.

BACKGROUND AND SUMMARY OF INVENTION

This invention relates to an improved apparatus and process for use in gas sterilization. More particularly, the invention pertains to an improved arrangement for use in sterilizing surgical, medical and dental instruments, dressings, precision apparatus and tools, other objects and the like by a process employing vapors. Furthermore, the process is carried out without the use of extreme heat, excessive moisture or corrosive liquids or electricity, by employing a gaseous sterilant such as ethylene oxide.

The term "sterilization" is used in this disclosure in its strictest technical sense and means the complete elimination of all forms of microorganisms from all surfaces of the material exposed to the extent the same may be determined under the most stringent conditions possible, and the terms "sterilant" or "sterilizing agent" mean a substance capable of accomplishing sterilization in accordance with the definition herein given.

A more specific object of the invention is to provide an apparatus for sterilizing medical, surgical and dental instruments, dressings, precision tools, apparatus and the like, which does not bring extreme heat, excessive moisture or corrosive liquids into contact with the items being sterilized; which does not have a deleterious effect on delicate cutting edges, cement mountings for optical instruments and the like or on plastic tubing or on other materials such as certain kinds of rubber, leather or wool; which effectively sterilizes instruments having rough or unusual surfaces, capillary tubes and the like; and which can be adapted for field use, small installations the like.

Still other objects of the subject invention include the provision of an apparatus for sterilizing using a gaseous sterilant which is effective at room temperatures and pressures at or near atmospheric; which is economical in practice; which is safe; which may be used in field, office or other locations without the need of heavy, bulky, complicated or expensive equipment and apparatus; which utilizes individual containers of sterilant; which obviates handling the sterilized objects or instruments after sterilization is completed and which is commercially and practicably feasible for widespread general use.

Yet a further object of this invention is to provide a means for the sterilization of contaminated objects of such shape, length and size that they are not adapted to be received within a chamber of at least moderate rigidity and conventionally portable size.

Still another object of the instant invention is to provide in a gaseous sterilization apparatus a completely flexible, collapsible, foldable, transparent, and easily replaceable sterilization chamber which is impervious to an ethylene oxide sterilizing gas mixture.

In general the above objects are accomplished, in accordance with this invention, by placing the objects, instruments and materials to be sterilized in air-tight, yet pervious to an ethylene-oxide sterilizing gas mixture, envelopes or containers; placing and sealing the envelopes or containers within a completely flexible, collapsible, ethylene-oxide sterilizing gas mixture impervious, baglike, sterilization chamber; reducing the pressure within the sterilization chamber; having the interior of the sterilization chamber in communication with a vessel containing a solution of the sterilant, said sterilant including a mixture of ethylene-oxide and a dilutent which is a flammability suppressant therefor and preferably a dilutent with a boiling point and vapor pressure so related to the boiling point and vapor pressure of the ethylene-oxide that the sterilant mixture is nonflammable and non-explosive in all vapor-liquid phases and relationship; releasing the sterilant mixture from the vessel while maintaining the sterilization chamber in a sealed condition, evaporating and admitting the sterilant mixture into the sterilization chamber; permitting the sterilant to sterilize the objects, instruments and materials; and evacuating or air washing the sterilization chamber and its contents without admitting toxic quantities of the sterilant to the atmosphere adjacent the sterilization chamber, all at room or ambient temperatures and at or near atmospheric pressures.

DESCRIPTION OF THE DRAWINGS

The novel features which are believed to be characteristic of this invention are set forth with particularity in the appended claims. The invention itself, however, both as to its organization and method of operation, may best be understood by reference to the following description taken in connection with the accompanying drawings in which:

FIG. 1 is a top plan view of the apparatus of this invention;

FIG. 2 is a side elevational view of the apparatus of this invention;

FIG. 3 is a cross-sectional view taken along line 3—3 of FIG. 1;

FIG. 4 is a transverse sectional view taken along line 4—4 of FIG. 3;

FIG. 5 is a perspective view of a baffle used with the apparatus of this invention;

FIG. 6 is a top plan view of another embodiment of the apparatus of this invention, portions thereof being omitted;

FIG. 7 is a cross-sectional view taken along line 7—7 of FIG. 6;

FIG. 8 is a perspective view of another clamp useable with the apparatus of this invention; and FIG. 9 is a perspective view of yet another clamp useable with the apparatus of this invention.

DETAILED DESCRIPTION

Referring to the drawings in detail now, and in particular to FIGS. 1 and 2 thereof, the sterilization apparatus 10 of this invention is seen to include a support or table 12. Table 12 is generally rigid and may be formed from such things as lumber, plywood, pressboard or Masonite and is supported at its ends by legs 14 and 16 and at appropriate points along its midportion by suitable legs or saw horses such as at 18.

Attached to the table top adjacent one of its ends is a pair, 20 and 22, of support brackets which are spaced apart and secured to the table by means of respective bolts 24 and 26. Positioned through an opening 28 within support bracket 20 and positioned within a slot or groove 30 of support bracket 22 is a circular rod 32 which is free to rotate within these openings 28 and 30. Mounted on circular rod 32 is a roll or supply 34 of flexible plastic film which is impervious to the ethylene oxide sterilizing gas mixture used in connection with this invention and which is used to make the sterilization chamber of the invention. Plastic film 36 on roll 34 is supplied as a continuous sleeve having both upper 38 and lower 40 portions which are connected to each other at their edges 42 and 44, and are continuous therealong. In forming the sterilization chamber to be used, a desired length of plastic film 36 is unrolled from supply 34 and cut therefrom, as has been done to form the sterilization chamber 46 shown in FIGS. 1 and 2. Once the desired length of plastic sleeve 36 has been severed from roll 34, it is spread out on table 12 as depicted in FIG. 1 and the objects, instruments, and materials 48 to be sterilized are placed within the sleeve as depicted in FIGS. 1 and 2.

Bar arrangements are provided, as at 50 and 52, to respectively seal the two open ends 54 and 56 of sleeve 36 which has now been spread-out on table 12 and filled with the items 48 which are to be sterilized. Bar assemblies 50 and 52, when thus sealing the ends of the sleeve, cause the same to result in a sealed sterilization chamber 46.

Bar assemblies 50 and 52 include a first or upper member and a second or lower member, these members being shown in greater detail in FIG. 3. Bar assembly 50 includes an upper member 58 and a lower member 60, while bar assembly 52 includes upper member 62 and lower member 64. All of the members 58 through 64 of the end sealing bar arrangements 50 and 52 are solid structures. Upper member 58 of sealing bar arrangement 50 includes a tongue portion 66 which is mateable within a groove portion 68 provided within member 60 of the same bar arrangement 50, such that these tongue and groove portions may firmly press the upper and lower portions 38 and 40 of the sleeve 36 together to form an efffective seal adjacent end 54 of the sleeve. Upper member 62 of end sealing bar arrangement 52 is provided with a tongue portion 70 which is mateable within a groove portion 72 provided within lower member 64 such that these tongue and groove portions may firmly press together the upper and lower portions of the sleeve and form an effective seal adjacent end 56 thereof. Upper member 58 and lower member 60 of bar assembly 50 are maintained closely adjacent one another with tongue portion 66 engaged within grooved portion 68 by a series of appropriately spaced and sized C-clamps as at 74. In like manner upper member 62 and lower member 64 of end sealing bar assembly 52 are maintained closely adjacent with tongue portion 70 engaged within grooved portion 72 by a number of appropriately spaced C-clamps 76.

It is to be understood that other types of sealing arrangements or clamps could be used in place of those depicted at reference numerals 50 and 52 and used to seal the open ends 54 and 56 of sleeve 36. One such arrangement could be provided to seal sleeve 36 adjacent its end 56, but without the necessity of requiring the sleeve 36 to be severed from the supply roll 34. Another arrangement for sealing the ends of sleeve 36 is depicted in FIG. 8. In the embodiment shown in FIG. 8 there is included a flat, elongated, narrow bar 59, having a length slightly greater than the width of sleeve 36. The open end, such as 54 or 56 of sleeve 36 which is to be sealed is wrapped or rolled about bar 59 three, four or five times and then a flattened C clip 61 is placed about the bar 59 and sleeve end rolled thereon to frictionally hold the sleeve in sealed position on bar 59 and prevent the same from unrolling.

Members 58 and 60 are supported adjacent their ends by a pair, 78 and 80 of supporting members. Support member 78 includes a generally horizontal portion 82 and a generally upright portion 84 having a slot 86 therein to receive bar members 58 and 60. Support member 80 includes a generally upright element 88 attached to a generally horizontal portion 90; upright element 88 including a slot 92 for receiving members 58 and 60. In a similar fashion bar assembly members 62 and 64 are supported adjacent their ends by means of a pair of support members 94 and 96. Support member 94 includes a generally horizontal portion 98 to which is attached a generally upright element 100 having an opening or slot 102 therein to receive bar members 62 and 64 and to prevent the same from turning therein. Support member 96 includes a generally upright portion 104 which is connected to a generally horizontal base portion 106; upright portion 104 including an opening or slot 108 for receiving members 62 and 64 of bar assembly 52 and to prevent the same from turning therein. Support members 78, 80, 94 and 96 rest upon table 12 and are not attached thereto, such that they may be moved and adjusted for varying widths and lengths of sleeve members, such as sleeve member 36, used for various sizes of sterilization chambers. Also, it is not necessary that the width of the sleeve along open ends 54 and 56 be such as to require the using of the total length of bar assemblies 50 and 52 to seal these open ends.

A baffle arrangement 110 and port assembly 112 used in connection with sterilization chamber 46 of this invention is most clearly depicted in FIGS. 3, 4 and 5. The baffle arrangement 110, most clearly shown in FIG. 5, includes a small metal box 114 which is attached to the upper flanged end 116 of a standard gas threaded nipple or pipe 118 through which the ethylene oxide sterilizing gas mixture passes in traveling to metal box 114 of the baffle arrangement. Metal box 114 includes a lower trough like portion 120 and a top or lid 122 which fits and seals the lower portion 120. Lid 122 is hingedly attached to the lower portion 120 by means of hinges 124 and 126 such that access to the interior of the box can be obtained. Holes 125 and 127 are provided in lid 122 to permit the gaseous sterilant to pass outward of the baffle arrangement into the sterilization chamber. A towel or cloth 128 which has been wet with water is placed within the box 114 to help and aid in the baffling of the sterilant. Baffle arrangement 110 including metal box 114 and towel 128 prevent liquefied sterilizing gas from getting into the sterilization chamber and further insures that the liquefied gas is completely evaporated before entering the sterilization chamber. The wet towel 128, in addition to acting as a baffle to catch any liquefied gas such that the same must evaporate before entering the sterilization chamber 46, humidifies the gas which is necessary for adequate sterilization of the materials contained within the sterilization chamber.

The port assembly 112, shown in detail in FIGS. 3 and 4, provides a means whereby the ethylene oxide sterilizing gas mixture may be permitted to enter the sterilization chamber while simultaneously preventing the outward leakage from the sterilization chamber of any of the sterilizing gas. Included within port assembly 112 is the nipple or pipe 118 having standard gas threads thereon which extends through an opening 130, having a diameter approximately equal to the diameter of pipe 118, within the lower portion 40 of plastic sleeve 36 and through an opening 132 within the table 12. Also included within the assembly is an upper metal disk or flange 134 which is positioned interiorly of the plastic sleeve and a lower metal flange or disk 136 which is positioned exteriorly of the plastic sleeve on the table top. Disk 134 has included therein a larger rubber washer 138 which faces and seals with plastic sleeve when the same is in use therewith, and flange 136 also includes a large rubber washer or disk-like member 140 which faces and seals with plastic sleeve when the disk is employed therewith. A hole 142 provided within disk 134 is threaded to correspond with and accept threaded nipple 118, such as to form an effective seal therewith; and a hole 144 provided within the center of disk 136 is unthreaded and very slightly larger than the nipple 118, but is not loose thereon, such that disk 136 can be readily slipped over threaded nipple 118. A nut 146 is threaded on nipple 118 adjacently above disk 134 to further strengthen and seal the connection between nipple 118 and disk 134. An additional nut 148 is threaded on nipple 118 beneath the table 12 and is tightenable on the nipple against the underside of table 12 to force disk 136 firmly against the outer side of plastic sleeve and disk 134 firmly against the inner side of the plastic sleeve above disk 136, thereby providing a sealing engagement between disk 134 lower portion 40 of the plastic sleeve and disk 136 to prevent escape within the port assembly area of the sterilizing gas from the sterilization chamber once the same has been admitted thereto.

Connected to the lower end of pipe 118 is a short nipple 150, the other end of which is connected to a control valve 152. A supply line 154 from a tank 156 or other suitable source of ethylene oxide sterilizing gas mixture is connected to the lower end of valve 152. Control valve 152 positioned closely adjacent the entry into the sterilization chamber is provided to regulate the flow of sterilizing gas to the sterilization chamber.

Cylinders, such as 156 containing the ethylene oxide sterilizing gas mixture used in this invention are commercially available and usually include from about 10 to 20 percent ethylene oxide with the remaining portion being made up of carbon dioxide or other suitable gas such as a halide substituted methane. These cylinders are usually provided with a control valve at the top thereof, such as valve 158.

The flexible, transparent sleeve 36 used to form and used as the sterilization chamber 46 must be of a material which can contain the ethylene oxide sterilizing gas mixture and prevent the same from seeping therethrough; in other words, the palstic film forming sleeve 36 must be impervious to the ethylene oxide gas mixture. Where others have failed in the past in a sterilization apparatus having a flexible, collapsible bag-like sterilization chamber, is that they have been unable to find or obtain a material which is sufficiently impervious to the ethylene oxide sterilizing gas mixture such that it could be appropriately used as a sterilization chamber. It has been determined, that if sleeve 36 is of a low porosity, high density plastic film, obtainable from a copolymer of vinylidene chloride and vinylchloride, it is sufficiently impervious to the ethylene oxide gas mixture to be suitably employed as a sterilization chamber, similar to that as shown at reference numeral 46. Such a plastic film is available commercially in the form of Saran type 18 plastic film manufactured by the Dow Chemical Company from a copolymer of vinylidene chloride and vinylchloride. The plastic film, Saran type 18 is of sufficiently high density and low porosity to be impervious to the highly penetrating ethylene oxide gas mixture, and is commercially available in the form of a sleeve such as indicated at reference numeral 36 and comes in a rolled form as at 34. While others have tried to use bag-like sterilization chambers fabricated from nylons, polyesters, and other like films they have not been successful because they would not properly and adequately contain the highly penetrable ethylene oxide gas mixture. It has further been discovered that not all type Saran plastic films are suitable to be employed as a sterilizing chamber with an ethylene oxide gas mixture, but only this particular type 18 which is a very low porosity and high density plastic film obtainable from a copolymer of vinylidene chloride and vinylchloride.

In using the sterilization apparatus of this invention an appropriate length of the Saran type 18 plastic sleeve 36 is unrolled from the supply 34 and severed therefrom. The so separated section of sleeve 36 is then spread out upon table 12 and a small hole 130 is made in the lower portion 40 of the sleeve adjacent one end thereof. Next the baffle arrangement is positioned within the sleeve as depicted in FIGS. 3 and 4 with gas nipple 118 extending through the hole 130 within the sleeve and through the opening 132 of the table 12. A wet towel or cloth 128 is placed within box 114 of the baffle arrangement and the port assembly 112 is positioned within and without the sleeve and tightened thereon by nut 148 as depicted in FIGS. 3 and 4. Now the articles and materials 48 which are to be sterilized and which have been previously sealed in suitable plastic film are placed within the sleeve 36 between the upper 38 and lower 40 portions thereof. Articles and materials 48 to be sterilized are placed within suitable containers of plastic film and sealed therein to prevent contamination from handling and the like thereof after being properly sterilized, and to permit storage thereof in the sealed sterilized condition until immediately prior to their intended use. The plastic film used as containers in which the materials to be sterilized are sealed must be of a type which is pervious to the ethylene oxide sterilizing gas mixture such that the same may pass freely into the containers to sterilize the contents thereof and after sterilization pass freely outward of the containers. Plastic film which has been found suitable in which to seal the contents before they are placed within sterilization chamber 46 for sterilization include cellulose, cellulose acetate, polyesters, polyethylenes, polypropylenes, polyvinyl chlorides, and other like plastic films. After the materials and objects 48 to be sterilized are placed within sterilization chamber 46 the same is sealed at its ends 54 and 56 by means of bar arrangements 50 and 52; tightly securing the C-clamps 74 and 76 about their respective bar arrangements. After sealing the sterilization chamber 46 the air therein is partially evacuated by means (not shown) through pipe 118 and valve 152 such that the sleeve 36 generally conforms to the shape of the load to be sterilized. Now the ethylene oxide sterilizing gas mixture is slowly admitted into the sterilization chamber 46; the gas coming from source of supply 156, through valve 158, flow line 154, flow valve 152 and baffle assembly 110. The gas mixture being baffled and evaporated in baffle assembly 110 before entering sterilization chamber and wet towel 128 further baffling evaporating and humidifying the sterilization gas before the same enters the seterilization chamber 46. The sterilizing gas is admitted into the sterilization chamber 46 until the same is approximately one-half full, as the compressed gas is cold and as the same warms it will expand to more completely fill the sterilization chamber. The load 48 to be sterilized is now exposed to the ethylene oxide sterilizing gas mixture for a period of about 16 to 24 hours to completely sterilize the contents of the chamber; the complete sterilization of the contents can be checked by gas indicator tapes and spore strips which are attached to load 48 prior to its being placed within chamber 46. When the sterilization is complete, the gas within chamber 46 is evacuated through nipple 118 and valve 152, and thereafter air is admitted to the chamber from the atmosphere through the same valve 156 and nipple 118. After admitting air to the chamber, the same may be opened by unclamping the bar assemblies 50 and 52 at the ends thereof and the load 48 therein may be removed from the sleeve. Thereafter the load 48 is allowed to decontaminate from the ethylene oxide gas before use for a period of approximately 24 hours, especially if the objects are to come in contact with the human body.

Another embodiment of the gas sterilization apparatus of this invention is depicted in FIGS. 6 and 7, reference numerals used in FIGS. 1 through 5 indicating the same or like parts when used in FIGS. 6 and 7. In the embodiment of the invention depicted in FIGS. 6 and 7 a second sleeve 160 having an upper portion 162, lower portion 164 and open ends 166 and 168 has been placed around sterilization chamber 46 to completely enclose and encapsulate the same. The outer sleeve 160, which is slightly larger than the inner sleeve 36, has side portions 170 and 172 which extend outward of the respective side portions 42 and 44 of the inner sleeve and end portions 166 and 168 which extend beyond the respective ends 54 and 56 of the inner sleeve 36, and may also be commercially obtained in the form of a sleeve which is supplied in a rolled condition, similar to roll 34. The plastic film making up the larger or additional sleeve 160 need not necessarily be Saran type 18 plastic film; or for that matter, any other type Saran plastic film, as sleeve 160 need not be impervious to the ethylene oxide sterilizing gas mixture. The only requirement of sleeve 160 is that in addition to being slightly larger than sterilization chamber 46 it be impervious to the passage of air therethrough and capable of being made air tight upon pinching and sealing the open ends 166 and 168 thereof within respective bar arrangements 50 and 52. That is to say, that sleeve 160 may be made of most any plastic film or other like film material which can be made air tight.

Outer sleeve 160 is provided with a valve or port assembly 174, similar to the valve used in connection with the inner tube of an automobile tire, which extends downward from the underneath side of table 12 through opening 176 therein. A small hole must be formed in the bottom portion 164 of the sleeve such that the stem 178 of the valve arrangement 174 can extend outward through the opening from the interior of the sleeve 160. Valve stem 178 is connected to disk 180 which is positioned on the inside of the sleeve. A second disk member 182 is slipped over the valve 178 to be positioned exteriorly of the sleeve and forced snugly against disk 180 with the sleeve therebetween by means of a nut 184. In this manner the port arrangement 174 is sealed to the bottom portion 164 of the sleeve.

In use the outer sleeve 160 is positioned about sterilization chamber 46 after the same has been loaded with the materials 48 which are to be sterilized and the baffle arrangement 110 and port assembly 112 positioned therein and secured thereon. After sleeve 160 has been positioned about inner sleeve 36 the open ends 54 and 56, and 166 and 168 of respective sleeves 36 and 160 are closed and sealed employing bar arrangements 50 and 52, being secured by means of C-clamps 74 and 76. Next the sterilization chamber 46 is partially evacuated and then a small amount of air is admitted into sleeve 160 through valve assembly 174, whereupon the ethylene oxide sterilizing gas mixture is admitted to sterilization chamber 76 as previously described hereinabove. When the desired amount of sterilant has been admitted to the sterilization chamber 46 the amount of air within outer sleeve 160 may be adjusted such that there is an air pressure within the outer sleeve or between about 15 and approximately 30 pounds p.s.i.g. In this manner the sterilization process may be speeded up from about 16 to 24 hours to about 6 to 8 hours to obtain complete sterilization of the objects 48 within sterilization chamber 46. The remainder of the sterilization process is carried out as described hereinabove. The only variation in this embodiment, as depicted in FIGS. 6 and 7, being that with the use of a second outer sleeve a small amount of pressure can be applied to the sterilization chamber to thereby substantially reduce the amount of time required to effect complete sterilization.

If it is desired to further speed up the sterilization process a source of heat, such as indicated by reference numeral 186 in FIGS. 1 and 6, may be added to and placed within the sterilization chamber 46 prior to sealing its ends. The heat source 186 can be almost any appropriate source of heat, such as a hot water bottle, heated bar of metal alloy which retains its heat or an electric heat generator preplaced within the sterilization chamber.

In addition to the aforementioned source of heat 186 could be one or a series of heat or infra-red lamps, such as depicted at reference numeral 188 in FIG. 3, positioned above and externally of the sterilization chamber; or the work surface 12 could be electrically warmed such as to impart heat to the ethylene oxide gas mixture within the sterilization chamber. The plastic film forming sleeve 36 is infra-red permeable to permit infra-red light from lamp 188 to penetrate the same and heat the sterilant within chamber or container 46. Heat source 186 acts as a catalyst during the sterilization process to speed up the same by heating the ethylene oxide sterilization gas mixture to a temperature somewhat above room temperature, whereby the time required for completion of the sterilization process is substantially reduced.

Additionally, indicating means such as depicted at reference numeral 190 can be placed within sleeve 36 and sealed therein with the articles 48 which are to be sterilized. Indicating means 190 can include temperature measuring and recording instruments, pressure measuring and recording instruments, humidity measuring and recording instruments, gas tape indicators, spore strips, and the like, such that the conditions within sterilization chamber 46 and the progress of the sterilization process could be observed and checked at all times.

In FIG. 9 is depicted an additional clamping arrangement for sealing an end of sleeve 36, such as at 56, without the necessity of severing sleeve 36 from the roll 34 of sleeving material. In this assembly there is provided a frame member 192 which is capable of completely surrounding a width of sleeve 36; and in which a bar arrangement, as at 52 including upper bar member 62 and lower bar member 64, may be placed with the sleeve passing therebetween. A plurality of threaded bolts 194 with rotatable tips 198 on their lower ends and handle members 196 on their upper ends extend through spaced and threaded openings within the upper portion of frame 192, such that bar member 62 may be compressed against bar member 64 to seal sleeve 36 therebetween.

While only certain preferred embodiments of this invention have been shown an described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. Sterilization apparatus for use in a gas sterilization process comprising in combination a flexible and collapsible gas-impermeable and unitary container having a side wall and closed ends, said side wall having an opening therein between said ends, detachable conduit means gas sealed through said opening, and means externally of said container for introducing a gas sterilant through said conduit means into said container.

2. The sterilization apparatus as defined in claim 1 wherein said container comprises a high density, low porosity copolymer of vinylidene chloride and vinylchloride film substantially impervious to an ethylene oxide sterilant gas mixture.

3. The sterilization apparatus as defined in claim 1 further comprising a source of infra-red light associated with said container to heat the gas sterilant within said container, said source of infra-red light being positioned exteriorly of said container, and said container being infra-red permeable.

4. The sterilization apparatus as defined in claim 1 wherein said container comprises a sleeve having open ends to permit easy access thereinto for the insertion of articles therein to be sterilized, and releasable means for compressing the open ends of said sleeve to close said ends against the escape of gas.

5. The sterilization apparatus as defined in claim 4 wherein said sleeve comprises a high density, low porosity copolymer of vinylidene chloride and vinylchloride film substantially impervious to an ethylene oxide sterilant gas mixture.

6. The sterilization apparatus as defined in claim 4 wherein said releasable means for compressing said open ends of said sleeve includes a first elongated bar having an elongated generally V-shaped groove extending throughout its length and being of a length greater than the width of said sleeve, a second elongated bar of substantially the same length as said first bar and having an elongated generally V-shaped tongue extending throughout its length, said tongue being complementary to said groove with said sleeve positioned there between, and means for releasably clamping said bars together thereby sealing said sleeve end in gas-tight relationship.

7. The sterilization apparatus as defined in claim 4 further comprising a second flexible and collapsible sleeve, said second sleeve having open ends and being formed from air-impermeable material, said second sleeve being of sufficient size to encapsulate said sleeve, said releaseable means for compressing said open ends of said sleeve further compressing said open ends of said second sleeve in air-tight relationship, and means for introducing air into and withdrawing the same from the interior of said second sleeve whereby pneumatic pressure may be applied to the exterior of said sleeve to decrease the time required to sterilize the articles within said sleeve.

8. The sterilization apparatus as defined in claim 4 wherein said conduit means is removable from said sleeve, wherein said sleeve is the end portion of a roll of sleeving, and means rearwardly of one of said releaseable means for supporting said roll, whereby upon removal of said conduit means and release of said releaseable means, said sleeve is readily replaced by a new section of sleeving unrolled from said roll.

9. The sterilization apparatus as defined in claim 4 wherein said releaseable means for compressing said open ends of said sleeve includes an elongated bar, one of said open ends of said sleeve along its width being wrapped around said bar, said releaseable means for compressing further including clamp means engaging said wrapped sleeve on said bar and compressing said sleeve end into a gas-tight closed condition.

10. The sterilization apparatus as defined in claim 9 wherein said elongated bar is of a length greater than the width of said sleeve.

11. The sterilization apparatus as defined in claim 10 wherein said clamp means includes an elongated channel of a length generally equal to the width of said sleeve and having two parallel flanges and a base therebetween, the distance between said flanges being less than the thickness of said bar with said sleeve wrapped therearound whereby said flanges frictionally engage said wrapped sleeve.

12. The sterilization apparatus as defined in claim 1 wherein said conduit means includes a tube extending through said opening in said side wall of said container, an internal washer sealed around said tube internally of said container, an external washer surrounding said tube juxtaposed to said internal washer and disposed externally of said container, and means cooperating with said tube to force said washers toward each other thereby to clamp said side wall of said container between said washers peripherally around said opening.

13. The sterilization apparatus as defined in claim 12 further comprising a baffle permeable to gas and substantially impermeable to liquid disposed within said container and connected to said tube to pass the gas sterilant received therethrough into said container interior and to block the entry of liquefied portions of the gas sterilant thereinto.

14. The sterilization apparatus as defined in claim 13 wherein said baffle includes a water-laden member, said member being adapted and arranged to humidify the gas sterilant passing therethrough.

15. Sterilization apparatus for use in a gas sterilization process comprising in combination a gas-impermeable container having a flexible and collapsible portion, means externally of said container for introducing a gas sterilant into said container, a second container, said second container being formed from an air-impermeable material and being of sufficient size to encapsulate said gas-impermeable container, and means for introducing air into and withdrawing the same from the interior of said second container whereby pneumatic pressure may be applied to the exterior of said gas-impermeable container to decrease the time required to sterilize articles insertable within said gas-impermeable container.

16. The sterilization apparatus as defined in claim 15 wherein said flexible and collapsible portion of said gas-impermeable container comprises a high density, low porosity copolymer of vinylidene chloride and vinylchloride film.

References Cited

UNITED STATES PATENTS

| 1,898,236 | 2/1933  | Blank        | 206—63.2    |
| 2,075,845 | 4/1937  | Gross et al. | 21—58 XR    |
| 2,572,669 | 10/1951 | Sarge et al. |             |
| 3,016,284 | 1/1962  | Trexler      | 206—63.2 XR |
| 3,025,649 | 3/1962  | Stuhlman     | 206—7 XR    |
| 3,038,593 | 6/1962  | Root et al.  | 206—5       |
| 3,093,242 | 6/1963  | Huyck et al. |             |
| 3,114,599 | 12/1963 | Fanning      | 21—58 XR    |
| 3,117,832 | 1/1964  | Thomas       | 21—58       |
| 3,238,096 | 3/1966  | Kaye         | 21—58 XR    |
| 3,372,980 | 3/1968  | Satas        | 21—58       |

MORRIS O. WOLK, Primary Examiner

B. S. RICHMAN, Assistant Examiner

U.S. Cl. X.R.

21—61, 82, 92, 93, 103, 104; 206—63.2